United States Patent
Arbab et al.

(10) Patent No.: US 7,275,258 B2
(45) Date of Patent: Sep. 25, 2007

(54) APPARATUS AND METHOD FOR MULTI-THREADED PASSWORD MANAGEMENT

(75) Inventors: Reza Arbab, Austin, TX (US); Rene Ruben Martinez, Cedar Park, TX (US); Daniel Paul McNichol, Cedar Park, TX (US); Jessica Kelley Murillo, Hutto, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1163 days.

(21) Appl. No.: 09/909,251

(22) Filed: Jul. 19, 2001

(65) Prior Publication Data

US 2003/0018919 A1  Jan. 23, 2003

(51) Int. Cl.
  *H04L 29/00* (2006.01)
(52) U.S. Cl. .............................. 726/6; 726/18; 713/183
(58) Field of Classification Search ................ 726/1, 726/2, 6–8, 17–19, 21
  See application file for complete search history.

(56) References Cited

U.S. PATENT DOCUMENTS

| | | | | |
|---|---|---|---|---|
| 5,611,048 A | * | 3/1997 | Jacobs et al. | 726/5 |
| 5,832,211 A | * | 11/1998 | Blakley et al. | 726/6 |
| 6,000,033 A | * | 12/1999 | Kelley et al. | 726/8 |
| 6,122,741 A | * | 9/2000 | Patterson et al. | 726/17 |
| 6,182,225 B1 | * | 1/2001 | Hagiuda et al. | 726/19 |
| 6,182,229 B1 | * | 1/2001 | Nielsen | 726/8 |
| 6,240,184 B1 | * | 5/2001 | Huynh et al. | 380/206 |

(Continued)

OTHER PUBLICATIONS

"Courion Announces New Version Of Identity Management Software Suite", Courion Corporation, Press Release, Jan. 2001, Retrieved from the Internet on Apr. 29, 2006: <URL: http://courion.com/news/releases/2001/suite4dot5_pr2001.asp>.*

(Continued)

*Primary Examiner*—Kim Vu
*Assistant Examiner*—Minh Dinh
(74) *Attorney, Agent, or Firm*—Duke W. Yee; Herman Rodriguez; Wayne P. Bailey

(57) ABSTRACT

An apparatus and method for multi-threaded password management are provided. With the apparatus and method, resources may be grouped into families of resources. A family of resources is defined as a group of resources that may make use of the same password. When a user sets a new password for a family of resources, all of the passwords for each of the resources in the family are reset to this new password. That is, the multi-threaded password management apparatus and method spawns threads to reset the passwords of the other resources in the family. In this way, a single operation of resetting a password for a resource in the family may cause a plurality of passwords to be reset. Moreover, the passwords need only be reset when the earliest reset time of the resources in the family occurs. Thus, the number of passwords that must be memorized by a user is significantly reduced. Furthermore, the number of times that passwords need be reset is also reduced due to the resetting of passwords on a group level.

26 Claims, 4 Drawing Sheets

U.S. PATENT DOCUMENTS

| | | | |
|---|---|---|---|
| 6,275,944 B1 * | 8/2001 | Kao et al. | 726/36 |
| 6,317,838 B1 * | 11/2001 | Baize | 726/11 |
| 6,397,337 B1 * | 5/2002 | Garrett et al. | 726/19 |
| 6,460,141 B1 * | 10/2002 | Olden | 726/4 |
| 6,732,278 B2 * | 5/2004 | Baird et al. | 726/7 |
| 6,826,692 B1 * | 11/2004 | White | 726/8 |
| 6,986,038 B1 * | 1/2006 | Leah et al. | 713/155 |

OTHER PUBLICATIONS

"M-Tech Releases P-Synch v4.2", M-Tech, Press Release, Feb. 2000, Retrieved from the Internet on Apr. 29, 2006: <URL: http://mtechit.com/news/rel_20000218.html>.*

Parker, T., "P-Synch", Linux Journal Issue No. 58, Feb. 1999, Retrieved from the Internet on Apr. 29, 2006: <URL: http://linuxjournal.com/node/3040/print>.*

Yasin, R., "Users Take Control Of Identity Mgm't", InternetWeek, Feb. 2001, Retrieved from the Internet on Apr. 29, 2006: <URL: http://internetweek.cmp.com/infrastructure01/infra021901-2.htm>.*

Stallings, W., "Operating Systems—Internal and Design Principles", Prentice Hall, 1998, 3$^{rd}$ Edition, pp. 71-74, 145-159.*

Randall, Manage Your Passwords, Dec. 19, 2000, PC Magazine, Retrieved from the Internet on Apr. 27, 2006: <URL: http://www.pcmag.com/print_article2/0,1217,a=5334,00.asp>.*

* cited by examiner

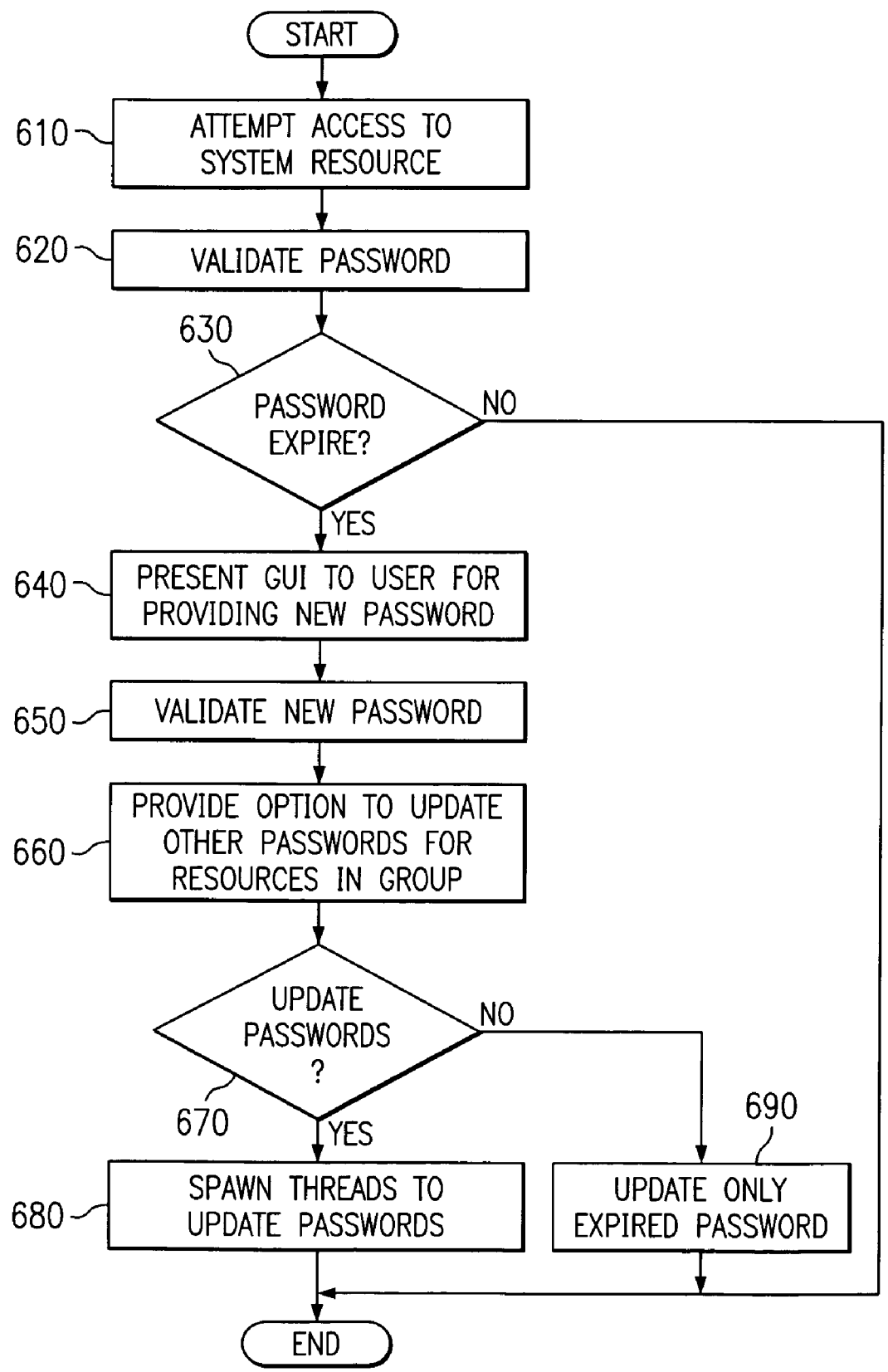

APPARATUS AND METHOD FOR MULTI-THREADED PASSWORD MANAGEMENT

BACKGROUND OF THE INVENTION

1. Technical Field

The present invention is directed to an improved data processing system. More specifically, the present invention is directed to an apparatus and method for multi-threaded password management.

2. Description of Related Art

Employees of companies are often required to use several different passwords to access different resources needed to perform their duties. Although the user identification is usually the same for all the resources, the passwords must in general be different. This requires that the employee memorize a number of different passwords as well as which passwords belong to which resources.

An additional burden is that in general all these passwords expire at different times. Thus, the employee is required to go through the process of generating a new password a plurality of times. It would be beneficial to have an apparatus and method by which the number of different required passwords, as well as the total number of times these passwords must be reset.

SUMMARY OF THE INVENTION

The present invention provides an apparatus and method for multi-threaded password management. With the apparatus and method of the present invention, resources may be grouped into families of resources. A family of resources is defined as a group of resources that may make use of the same password.

When a user sets a new password for a family of resources, all of the passwords for each of the resources in the family are reset to this new password. That is, the multi-threaded password management apparatus and method of the present invention spawns threads to reset the passwords of the other resources in the family. In this way, a single operation of resetting a password for a resource in the family may cause a plurality of passwords to be reset.

Moreover, the passwords need only be reset when the earliest reset time of the resources in the family occurs. Thus, the number of passwords that must be memorized by a user is significantly reduced. Furthermore, the number of times that passwords need be reset is also reduced due to the resetting of passwords on a group level.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a flowchart outlining an exemplary operation of the present invention when updating resource group passwords.

DETAILED DESCRIPTION OF THE PREFERRED EMBODIMENT

Figure 1:
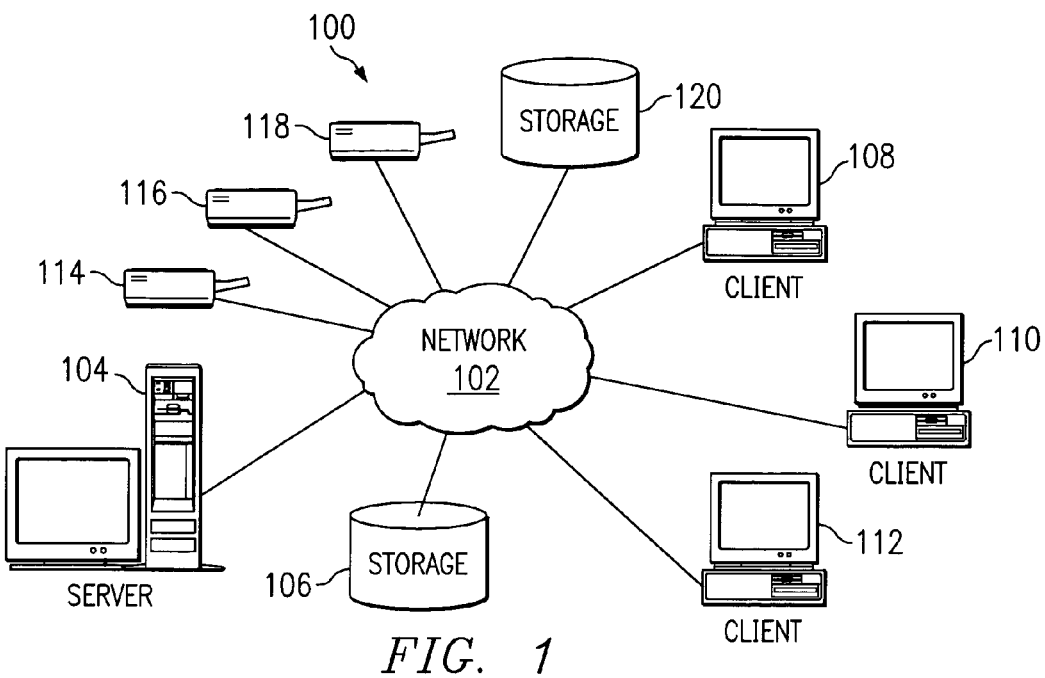
FIG. 1 is an exemplary block diagram illustrating a distributed data processing system according to the present invention.

With reference now to the figures, FIG. 1 depicts a pictorial representation of a network of data processing systems in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include connections, such as wire, wireless communication links, or fiber optic cables.

In the depicted example, server 104 is connected to network 102 along with clients 108, 110, and 112. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In addition to the above, various resources are coupled to the network 102. These resources may be, for example, printers, storage devices, servers, and the like. In the depicted example, the resources include printers 114-118 and storage devices 106 and 120. These resources are accessible by the client devices 108-112 via the network 102 and server 104, for example. The resources may have security measures associated with them, such as password protection, or the like, that is used to limit access to the resources to only those users that are authenticated through an authentication process. For example, a user must enter a valid user identification and password to obtain access to the resources.

In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
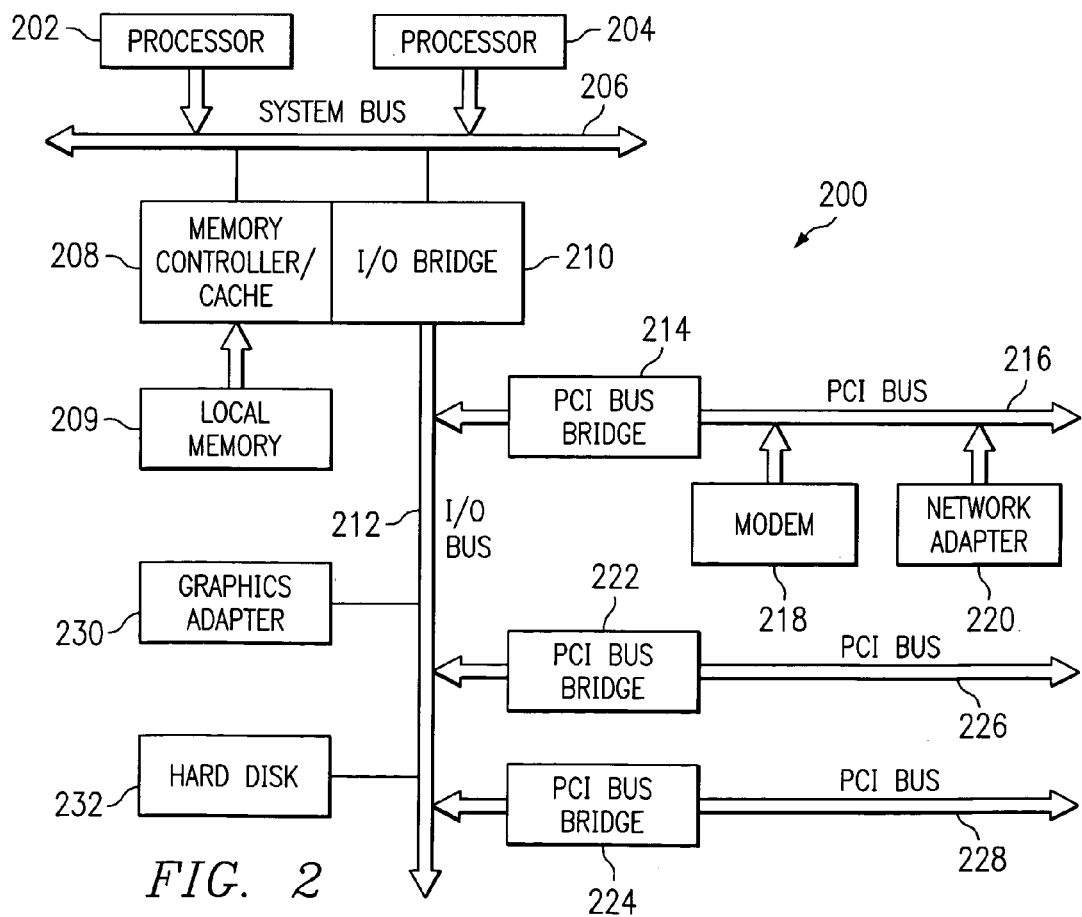
FIG. 2 is an exemplary block diagram of a server apparatus according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
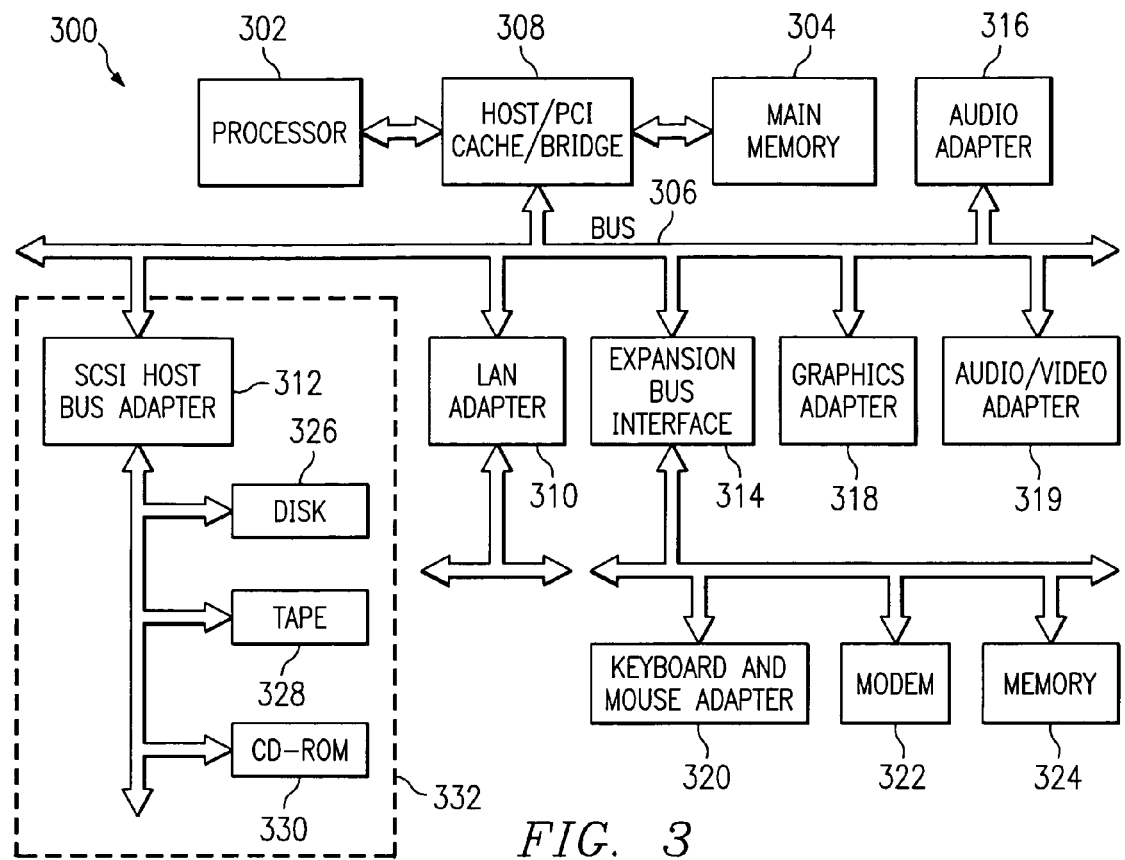
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides an apparatus and method for managing passwords on a group basis. With the apparatus and method of the present invention, resources may be organized into groups based on whether or not the resources are capable of using the same password and user identification. For example, if a plurality of printers, such as printers 114-118, are available on the distributed data processing system 100, the printers, or portions thereof, may be grouped into "families." Each of the resources assigned to the same "family" may make use of the same user identification and password. Through the use of the multi-thread password management apparatus and method of the present invention, the password associated with a family of resources may be updated and thereby, the passwords of each of the individual resources in the family are updated.

The multi-thread password management apparatus of the present invention may be implemented as software, hardware, or a combination of software and hardware. In a preferred embodiment, the present invention is implemented as software instructions executed by a processor.

The multi-thread password management apparatus may be implemented in a server apparatus, client apparatus, or distributed across a plurality of devices in a distributed data processing system. In a preferred embodiment, the present invention is implemented in a server apparatus to which client devices may obtain access.

Initially, when a user first logs onto the multi-thread password management apparatus of the present invention, e.g. logs onto server 104, the user is provided with the option of defining "families" of resources for which the user may designated a general password. The resources that may be grouped into families may be limited by parameters associated with the resources. That is, parameters may be associated with a resource that indicates what other resources may be grouped with it to form a family. Such parameters may be indications of security level, accessibility, resource type, and the like, of the resources. This feature allows a system administrator or the like to maintain security of sensitive resources by limiting whether they can be grouped with other resources and to which resources they may be grouped.

The user may be presented with a list, graphical representation, or the like of the resources. The list, graphical representation, or the like may further include an indicator of which resources may be grouped with one another. The user may then select various ones of the resources to be grouped with one another into a resource "family" and provide a name or indicator for identifying the group.

The user may have already established passwords and user identifiers for these resources. In this case, the user may select an option to change the passwords of all of the resources in the family to a new password to be input by the user. Alternatively, the user may continue to use the individual passwords until a first resource in the family requires resetting of the password. At such time, the user will again be provided with the option to update all of the passwords of the resources in the corresponding family.

When a resource in a resource family has a password that is about to expire, the next time the user logs onto the multi-threaded password management system of the present invention, the user will be prompted to enter a new password. The user will further be asked whether he/she wishes to change the passwords for the other resources in the resource family and may be presented with a listing or display identifying the other resources. The user may then update the passwords for all of these resources, none of the resources, or select certain ones of the resources to have their passwords updated.

The listing of resources associated with the family, to which the original resource whose password is about to expire, may be obtained from a data structure that stores the family associations for the user. The data structure may be stored on a server, on the client device, or the like. In addition, in one exemplary embodiment, the family associations may be stored by the resources themselves such that when a password is to be changed by the user, the resources are polled to determine which resources belong to the same family as the one whose password is to be changed.

In a preferred embodiment, however, the family data structure is stored on a server. The data structure may contain information regarding each user, the family organization of the resources for each user, and may include the passwords, expiration times, resource addresses, and the like, for each family of resources and each individual resource, depending on the particular implementation.

Based on the selection of the user to either update all, none, or some of the resources in a resource family, the multi-thread password management system of the present invention will initiate one or more processes that spawn threads to change the passwords for the selected resources. The processes use the resource organization defined by the data structure as well as the resource address information from the data structure, to initiate processes for changing the password for the resource. Alternatively, in a preferred embodiment, the password associated with the resource may simply be updated in the data structure rather than having to update the password on the resource itself. In this way, the user may update a plurality of passwords from a single password update entry.

Furthermore, for each of the resources whose passwords are updated, the time for expiration of the password may be set to be the same. However, in some systems, the password time period may be different for different resources and the updating of the password may reset the valid time period but the time period may be different from other resources that are also updated at that time.

Figure 4:
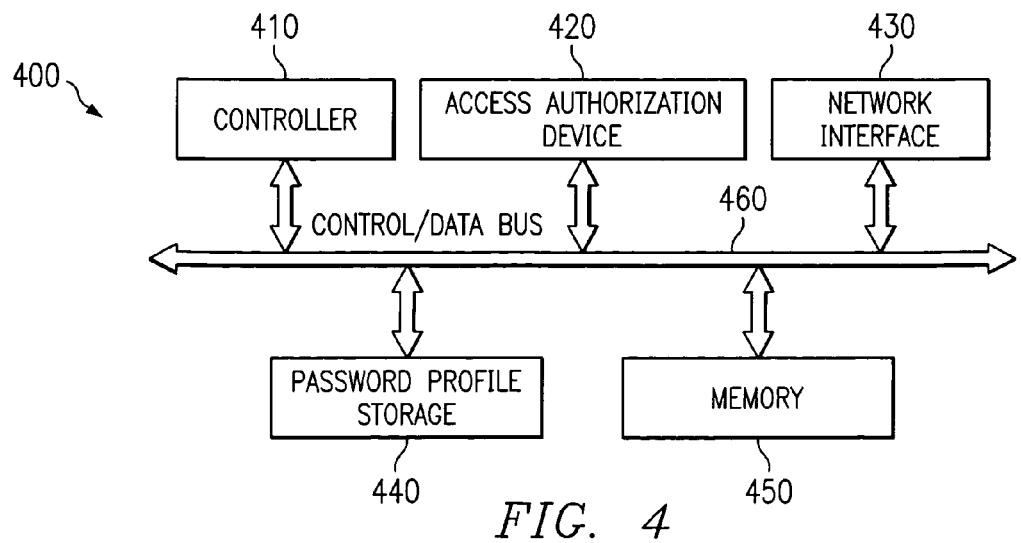
FIG. 4 is an exemplary block diagram of a multi-threaded password management apparatus according to the present invention.

FIG. 4 is an exemplary block diagram illustrating a multi-thread password management system according to the present invention. The elements shown in FIG. 4 may be implemented in software, hardware, or a combination of software and hardware as mentioned above.

As shown in FIG. 4, the multi-thread password management system 400 includes a controller 410, an access authorization device 420, a network interface 430, a password profile storage device 440, and a memory 450. These elements are coupled to one another via the control/data bus 460. Although a bus architecture is shown in FIG. 4, other architectures may be used that facilitate the exchange of control/data signals between the elements 410-450, without departing from the spirit and scope of the present invention.

The controller 410 controls the overall operation of the multi-thread password management system 400 and orchestrates the operation of the other elements 420-440 based on one or more control programs stored in memory 450. The controller 410 receives a request for access to resources from a client device via the network interface 430. The controller 410 may respond by requesting that the user enter a user identification and password.

Upon receiving the user identification and password, the controller 410 forwards this information to the access authorization device 420 which authenticates the user identification and password based on information stored in the password profile storage 440. The password profile storage 440 stores information regarding user identifications and corresponding password(s) for resources on the network. The password profile storage 440 preferably stores the resource passwords for each of the resources as well as families of resources. For example, the password profile storage 440 may store a separate record for each user identification having separate fields for each resource coupled to the network. These fields may further include fields that identify which family the resource belongs to.

Based on the particular password entered by the user, the multi-thread password management system 400 may authorize the user to access a particular resource or family of resources. An indication of the resource(s) to which access is granted may be provided to the user via the network interface 430.

In addition, the access authorization device 420 may determine whether a password is to be updated. If the password is to be updated, the access authorization device 420 may send a message to the user via the network interface 420 prompting the user to enter a new password. In addition, the access authorization device 420 may ask the user to indicate whether the user wishes to update the passwords for all, none, or some of the other resources associated with the resource family. Based on the user's selection, the access authorization device 420 may initiate processes to spawn threads to change the passwords for each of the selected resources. These threads may simply update the password for the family of resources or the individual resources in the password profile storage 440, may perform functions to update the password on the resource(s) themselves, initiate update operations on the client device, and the like, depending on the particular implementation. In a preferred embodiment, the threads update the passwords in the password profile storage 440.

Figure 5:
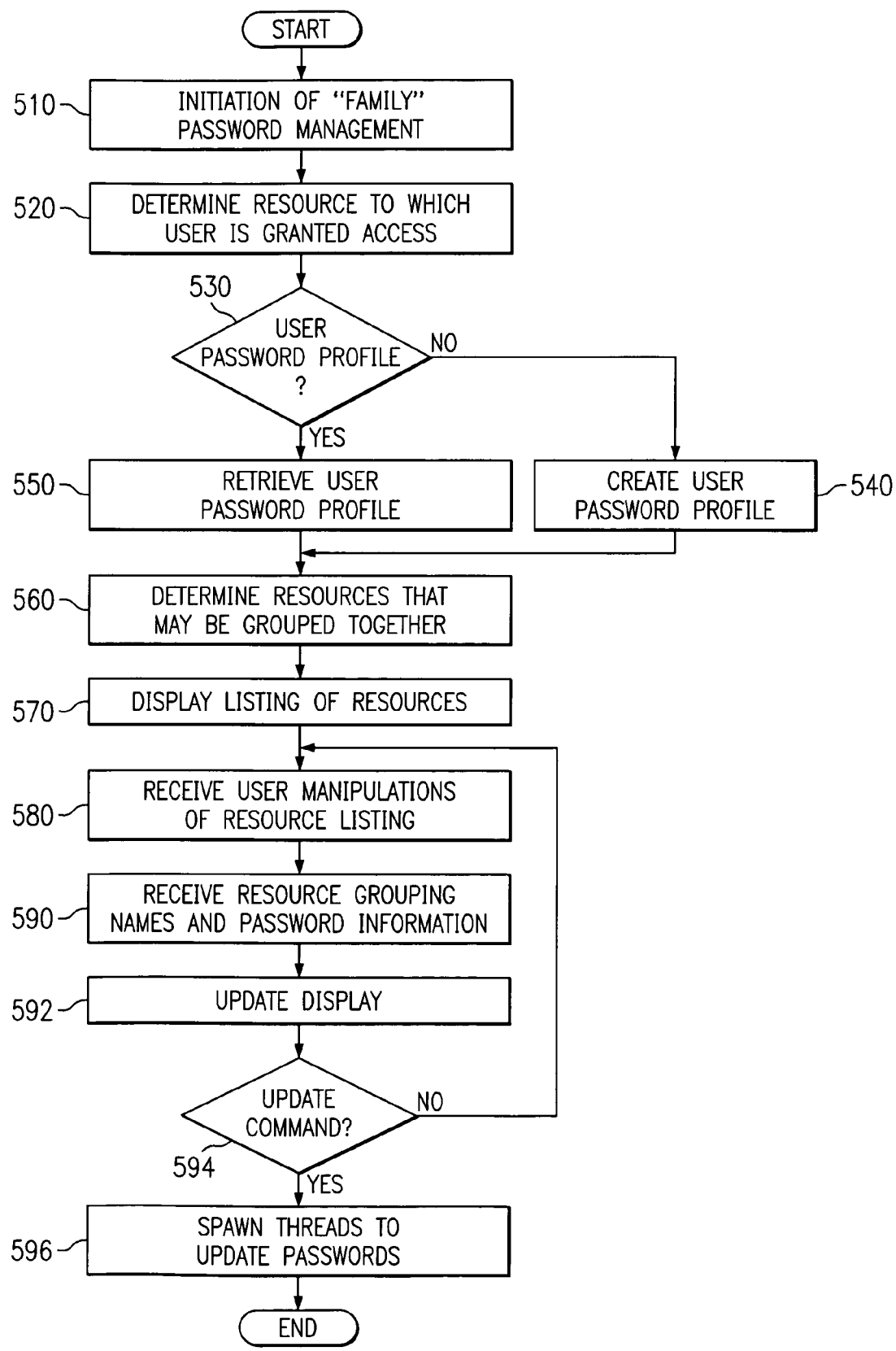
FIG. 5 is a flowchart outlining an exemplary operation of the present invention when generating groupings of resources.

FIG. 5 is an flowchart outlining an exemplary operation of the present invention when generating families of resources. As shown in FIG. 5, the operation starts with receiving an initiation of the family password management from a user (step 510). The resources to which the user is granted access are determined (step 520). The determination of resources to which the user is granted access may be determined in any number of different known ways, including querying a database in which user access levels and corresponding resources are identified.

A determination is made as to whether the user already has an established user password profile (step 530). If not, a new user password profile is created (step 540) and a determination is made as to which resources to which the user is granted access may be grouped together (step 560).

If the user already has an established user password profile, the user's password profile is retrieved (step 550). The listing of resources is then displayed (step 570). If the user already has an established password profile, the display of the listing of resources may include displaying the listing of resources from the user's password profile with indications of which resources are grouped with one another and which resources may be grouped to one another. If the user does not already have an established user password profile, the listing may include indications of which resources may be grouped to one another.

The user may then manipulate the groupings of the resources using a graphical user interface or the like (step 580). The user may further enter resource group names, password information, and other information (step 590). The display of the listing of resources and their associations may be updated as the user performs operations to manipulate the groupings (step 592).

A determination is then made as to whether the user enters an update command (step 594). If not, the operation returns to step 580. If so, threads are spawned to update the password information for each group that was modified by the user using the graphical user interface (step 596). The operation then ends.

FIG. 6 is a flowchart outlining an operation of the present invention when a user updates a group password. As shown in FIG. 6, a user attempts to access a system resource and enters a password for accessing the system resource (step 610). The password entered by the user is validated (step 620) and a determination is made as to whether the password is about to expire (step 630). If not, the operation ends. If the password is about to expire, the user is presented with a graphical user interface for providing a new password (step 640). The new password is validated (step 650) and an option is presented to the user for updating all of the passwords for the resources in the resource group (step 660). The option may include a listing of the resources that will be updated if the user so chooses. Alternatively, the user may be allowed to choose which of the resources may have their passwords updated from the listing of resources presented.

A determination is made as to whether the user elects to update passwords for other ones of the listed resources (step 670). If the user elects to update the password for other resources in the resource group, threads are spawned to update the passwords (step 680). If the user elects not to update the password for the other resources, the password for the resource having the expired password is updated (step 690) and the operation ends.

Thus, the present invention provides an apparatus and method for updating passwords on a group basis. The apparatus and method of the present invention allows a user to define groups of resources that may use the same password and update the password as a group. In addition, the present invention allows a user to select various ones of the resources in a group for which the user wishes to update an associated password.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of managing resource passwords for resources organized into a plurality of groups of resources, comprising:
    providing a user with a listing of resources to which the user is given access, wherein providing the user with a listing of resources includes providing the user with a display that indicates which of the resources may be grouped together based upon non-password security parameters associated with the resources;
    receiving selections from the user for grouping various ones of the resources into groups of resources;
    storing the plurality of groups of resources in a user password profile;
    identifying a plurality of resources that are part of a group of resources by retrieving the user password profile in which the plurality of groups of resources are identified along with corresponding group password information for each of the plurality of groups of resources;
    updating a first password for a first resource in the group of resources; and
    updating a second password for a second resource in the group of resources based on the updating of the first password for the first resource.

2. The method of claim 1, wherein the first password and the second password are the same.

3. The method of claim 1, wherein updating a second password for a second resource in the group of resources includes updating passwords for each of the resources in the group of resources to be the same as the first password.

4. The method of claim 1, wherein updating the first password for the first resource and updating the second password for the second resource are both performed in response to determining that the first password is about to expire.

5. The method of claim 1, wherein at least one process spawns threads to update the first password and second password in response to updating the group password information.

6. The method of claim 1, wherein providing the user with a listing of resources includes providing the user with a display that indicates which of the resources are already grouped with one another.

7. The method of claim 1, further comprising:
storing a password in association with each of the groups of resources, wherein the password is used with each of the resources in a corresponding group of resources.

8. The method of claim 1, wherein updating a second password for a second resource in the group of resources includes updating only selected ones of the resources in the group of resources.

9. The method of claim 1, wherein updating a second password for a second resource in the group of resources iccludes:
prompting a user to change a password for one or more of the resources in the group of resources; and
changing the password for the one or more resources selected by the user.

10. The method of claim 9, wherein the one or more resources selected by the user includes all of the resources in the group of resources.

11. The method of claim 1, wherein the group of resources is a group of resources each of which use the same password to authenticate a user's access to the resource 12. The method of claim 1, wherein the user password profile is stored on a server.

13. The method of claim 1, wherein the user password profile is stored on a client device.

14. The method of claim 1, wherein the user password profile is distributed across the resources.

15. The method of claim 1, wherein updating the second password is performed automatically.

16. A computer program embodied in a computer storage medium and operable in a data processing system for managing resource passwords for resources organized into a plurality of groups of resources, comprising:
first instructions executable by the data processing system for providing a user with a listing of resources to which the user is given access, wherein providing the user with a listing of resources includes providing the user with a display that indicates which of the resources may be grouped together based upon non-password security parameters associated with the resources;
second instructions executable by the data processing system for receiving selections from the user for grouping various ones of the resources into groups of resources;
third instructions executable by the data processing system for storing the plurality of groups of resources in a user password profile;
fourth instructions executable by the data processing system for identifying a plurality of resources that are part of a group of resources by retrieving the user password profile in which the plurality of groups of resources are identified along with corresponding group password information for each of the plurality of groups of resources;
fifth instructions executable by the data processing system for updating a first password for a first resource in the group of resources; and
sixth instructions executable by the data processing system for updating a second password for a second resource in the group of resources based on the updating of the first password for the first resource.

17. The computer program of claim 16, wherein the first password and the second password are the same.

18. The computer program of claim 16, wherein the sixth instructions for updating a second password for a second resource in the group of resources include instructions for updating passwords for each of the resources in the group of resources to be the same as the first password.

19. The computer program of claim 16, wherein the fifth instructions for updating the first password for the first resource and the sixth instructions for updating the second password for the second resource are both executed in response to determining that the first password is about to expire.

20. The computer program of claim 16, wherein at least one process spawns threads to update the first password and second password in response to updating the group password information.

21. The computer program of claim 16, wherein the instructions for providing the user with a listing of resources include instructions for providing the user with a display that indicates which of the resources are already grouped with one another.

22. The computer program of claim 16, further comprising:
instructions for storing a password in association with each of the groups of resources, wherein the password is used with each of the resources in a corresponding group of resources.

23. The computer program of claim 16, wherein the sixth instructions for updating a second password for a second resource in the group of resources include instructions for updating only selected ones of the resources in the group of resources.

24. The computer program of claim 16, wherein the sixth instructions for updating a second password for a second resource in the group of resources include:
instructions for prompting a user to change a password for one or more of the resources in the group of resources; and
instructions for changing the password for the one or more resources selected by the user.

25. The computer program of claim 23, wherein the one or more resources selected by the user includes all of the resources in the group of resources.

26. An apparatus for managing resource passwords, comprising:
means for providing a user with a listing of resources to which the user is given access, wherein providing the user with a listing of resources includes providing the user with a display that indicates which of the resources may be grouped together based upon non-password security parameters associated with the resources;
means for receiving selections from the user for grouping various ones of the resources into groups of resources;
means for storing the plurality of groups of resources in a user password profile;
means for identifying a plurality of resources that are part of a group of resources by retrieving the user password profile in which the plurality of groups of resources are identified along with corresponding group password information for each of the plurality of groups of resources;
means for updating a first password for a first resource in the group of resources; and
means for updating a second password for a second resource in the group of resources based on the updating of the first password for the first resource.

* * * * *